UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

BLUE-BLACK DISAZO DYE.

SPECIFICATION forming part of Letters Patent No. 593,790, dated November 16, 1897.

Application filed December 16, 1896. Renewed October 13, 1897. Serial No. 655,080. (Specimens.) Patented in England May 17, 1893, No. 9,894, and in France October 24, 1893, No. 233,609.

*To all whom it may concern:*

Be it known that we, MORITZ ULRICH and JOHANN BAMMANN, doctors of philosophy and chemists, subjects of the German Emperor, residing at Elberfeld, Germany, (assignors to the FARBENFABRIKEN, VORMALS FR. BAYER & CO., of Elberfeld,) have invented a new and useful Improvement in the Manufacture of Wool-Dyeing Disazo Coloring-Matters, (for which the aforesaid FARBENFABRIKEN has already obtained Letters Patent in England, No. 9,894, dated May 17, 1893, and in France, No. 233,609, dated October 24, 1893,) of which the following is a specification.

Our invention relates to the production of a new coloring-matter by first combining one molecular proportion of paradiazobenzene-sulfo-acid with one molecular proportion of $alpha_1$ amido-$alpha_4$ naphthol-$alpha_2$ sulfo-acid or salts thereof in a weakly mineral-acid solution, and, secondly, combining the intermediate product thus obtained with one molecular proportion of alpha-diazonaphthalene in alkaline solution.

In carrying out our invention practically we proceed as follows: 19.5 kilos, by weight, of the sodium salt of parasulfanilic acid are dissolved in one thousand liters of water and 22.5 liters of concentrated hydrochloric acid (containing 36.5 per cent. HCl) are added. The diazotizing of the aforesaid sulfanilic-acid solution is performed in the usual manner by means of seven kilos, by weight, of sodium nitrite dissolved in a small quantity of water. The thus-obtained diazo solution, after carefully neutralizing the hydrochloric acid by means of soda-lye, is allowed to flow slowly at about 5° centigrade into a watery mixture prepared by dissolving twenty-four kilos, by weight, of $alpha_1$ amido-$alpha_4$ naphthol-$alpha_2$ sulfo-acid in dilute soda-lye and adding to this solution, under continuous stirring, as much hydrochloric acid as is necessary to separate the free amidonaphtholsulfo-acid.

On the addition of the paradiazobenzene-sulfo-acid solution the color of the above mixture turns into red and gets gradually darker and darker and after a short time the monoazo compound begins to separate. The mixture is kept at about 5° centigrade and well stirred until the whole amidonaphtholsulfo-acid is dissolved and the formation of the intermediate product is finished. The precipitate is filtered off and dissolved in dilute soda-lye. A watery solution of 14.3 kilos, by weight, of alpha-naphthylamin dissolved with the addition of eighteen liters of concentrated hydrochloric acid (containing 36.5 per cent. of HCl) and diazotized in the well-known manner by means of 6.9 kilos, by weight, of sodium nitrite is added, under continuous stirring, to the above alkaline solution of the monoazo compound. It is necessary to keep the temperature at about 15° centigrade and to maintain the liquid alkaline by the addition of sodium carbonate during the whole process.

The formation of the new dyestuff begins immediately and is finished after about two hours.

The greater part of the dyestuff separates, and that quantity which has remained dissolved can easily be precipitated by the addition of common salt. When the coloring-matter has been perfectly separated, it is filtered off and dried in the usual manner.

Our new dyestuff corresponds probably to the following formula:

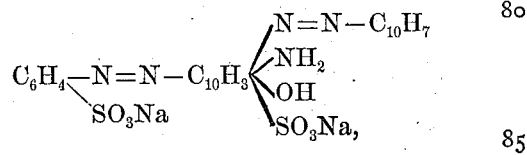

and when dried and finely powdered it represents a powder with metallic copper-like luster. In cold water it is soluble with violet-black color, which color turns into blue on the addition of ammonia liquor. By the addition of dilute sulfuric acid (ten per cent.) to the watery solution of the dyestuff a dark greenish-blue flaky precipitate is formed. It is dissolved with greenish-blue color by concentrated sulfuric acid, (66° Baumé,) and on adding a small quantity of ice-water to this sulfuric-acid solution a greenish-blue flaky precipitate is separated. In alcohol the dyestuff is soluble with greenish-blue color. It dyes unmordanted wool in acid-baths fast blue-back shades.

Having now described our invention and in what manner the same is to be performed, what we claim as new, and desire to secure by Letters Patent, is—

1. The process for the production of a new disazo coloring-matter by first combining one molecular proportion of paradiazobenzene-sulfo-acid with one molecular proportion of alpha$_1$ amido-alpha$_4$ naphthol-alpha$_2$ sulfo-acid or salts thereof in a weakly mineral-acid solution and secondly combining the intermediate product thus obtained with one molecular proportion of alpha-diazonaphthalene in alkaline solution, substantially as described.

2. As a new article of manufacture the blue-black wool-dyeing disazo coloring-matter having probably the formula:

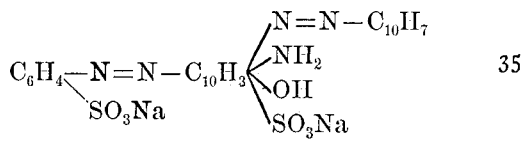

being when pulverized a powder with metallic copper-like luster, soluble in cold water with violet-black color, soluble in alcohol with blue color, soluble in dilute ammonia liquor with blue color, soluble in concentrated sulfuric acid with greenish-blue color which solution separates on the addition of a small quantity of ice-water a greenish-blue flaky precipitate, dyeing wool in acid-baths blue-black shades fast to the action of alkali and acid, also fast to the action of light, substantially as described.

In testimony whereof we have signed our names in the presence of two subscribing witnesses.

MORITZ ULRICH.
JOHANN BAMMANN.

Witnesses:
OTTO KÖNIG,
H. F. HESS.